(12) United States Patent
Park et al.

(10) Patent No.: US 10,464,547 B2
(45) Date of Patent: Nov. 5, 2019

(54) VEHICLE WITH MODEL-BASED ROUTE ENERGY PREDICTION, CORRECTION, AND OPTIMIZATION

(71) Applicant: GM GLOBAL TECHNOLOGY OPERATIONS LLC, Detroit, MI (US)

(72) Inventors: David S. Park, Novi, MI (US); Kevin J. Smith, Howell, MI (US); Terence L. Meehan, Williamston, MI (US); Todd P. Lindemann, Howell, MI (US); Richard B. Weinberg, Highland, MI (US); James B. Nicholson, Albion, MI (US); Chia-Hsiang Liu, Northville, MI (US); Andrew M. Zettel, Port Moody (CA); Ramon A. Alonso, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 15/648,964

(22) Filed: Jul. 13, 2017

(65) Prior Publication Data

US 2019/0016329 A1 Jan. 17, 2019

(51) Int. Cl.
*B60L 9/00* (2019.01)
*B60W 20/12* (2016.01)
(Continued)

(52) U.S. Cl.
CPC .............. *B60W 20/12* (2016.01); *B60L 3/12* (2013.01); *B60L 15/2045* (2013.01);
(Continued)

(58) Field of Classification Search
CPC ...... B60W 20/12; B60W 20/40; B60W 50/14; B60W 20/13; B60W 2050/146; B60W 2710/244; B60W 2520/105; B60W 2510/244; B60W 2510/305; B60W 2510/107; B60W 2550/12; B60W 2550/22; B60L 11/1861; B60L 2240/667; B60L 2240/665; B60L 2210/42; B60L 11/1879;
(Continued)

(56) References Cited

U.S. PATENT DOCUMENTS 8,918,240 B2 * 12/2014 Manickaraj ........... B60W 20/00
180/65.8
9,057,621 B2 * 6/2015 Tate, Jr. ............. G01C 21/3469
(Continued)

*Primary Examiner* — Shardul D Patel
(74) *Attorney, Agent, or Firm* — Quinn IP Law

(57) ABSTRACT

A vehicle includes drive wheels, an energy source having an available energy, a torque-generating device powered by the energy source to provide an input torque, a transmission configured to receive the input torque and deliver an output torque to the set of drive wheels, and a controller. The controller, as part of a programmed method, predicts consumption of the available energy along a predetermined travel route using onboard data, offboard data, and a first logic block, and also corrects the predicted energy consumption using the onboard data, offboard data, and an error correction loop between a second logic block and the first logic block. The controller also executes a control action with respect to the vehicle using the corrected energy consumption, including changing a logic state of the vehicle.

20 Claims, 5 Drawing Sheets

(51) Int. Cl.
  *B60W 20/13* (2016.01)
  *B60W 50/14* (2012.01)
  *B60W 20/40* (2016.01)
  *B60L 3/12* (2006.01)
  *B60L 15/20* (2006.01)

(52) U.S. Cl.
  CPC ............ *B60W 20/13* (2016.01); *B60W 20/40* (2013.01); *B60W 50/14* (2013.01); *B60L 2210/10* (2013.01); *B60L 2210/42* (2013.01); *B60L 2240/12* (2013.01); *B60L 2240/485* (2013.01); *B60L 2240/622* (2013.01); *B60L 2240/662* (2013.01); *B60L 2240/665* (2013.01); *B60L 2240/667* (2013.01); *B60L 2240/68* (2013.01); *B60L 2250/16* (2013.01); *B60L 2260/26* (2013.01); *B60L 2260/48* (2013.01); *B60L 2260/52* (2013.01); *B60L 2260/54* (2013.01); *B60W 2050/146* (2013.01); *B60W 2510/107* (2013.01); *B60W 2510/244* (2013.01); *B60W 2510/305* (2013.01); *B60W 2520/105* (2013.01); *B60W 2550/12* (2013.01); *B60W 2550/22* (2013.01); *B60W 2710/244* (2013.01)

(58) Field of Classification Search
  CPC ............ B60L 2210/10; B60L 2260/26; B60L 2260/52; B60L 2260/48; B60L 2240/485; B60L 2240/68; B60L 2260/54

USPC ................ 701/22; 903/902, 944; 180/65.29
  See application file for complete search history.

(56) References Cited

U.S. PATENT DOCUMENTS

| | | |
|---|---|---|
| 9,079,507 B2 | 7/2015 | Smith et al. |
| 9,739,624 B2 | 8/2017 | Rajagopalan et al. |
| 2004/0117078 A1* | 6/2004 | Corcione ................ B60K 6/48 701/22 |
| 2012/0203404 A1* | 8/2012 | Mituta ................ B60W 10/08 701/22 |
| 2013/0013141 A1* | 1/2013 | Neiss ................ B60K 6/48 701/22 |
| 2016/0023649 A1* | 1/2016 | Muller ................ G01C 21/26 701/22 |
| 2016/0101708 A1* | 4/2016 | Zhang ................ B60L 11/1861 320/128 |
| 2016/0141672 A1* | 5/2016 | Toida ................ H01M 8/04402 429/415 |
| 2017/0066429 A1* | 3/2017 | Ogawa ................ B60L 58/13 |
| 2017/0232958 A1* | 8/2017 | Hata ................ B60W 20/15 701/22 |
| 2017/0240174 A1* | 8/2017 | Sawada ................ B60K 6/48 |
| 2018/0312158 A1* | 11/2018 | Morimoto ................ B60K 6/48 |
| 2018/0356242 A1 | 12/2018 | Kritzmacher et al. |

* cited by examiner

VEHICLE WITH MODEL-BASED ROUTE ENERGY PREDICTION, CORRECTION, AND OPTIMIZATION

INTRODUCTION

Vehicles may be configured to use a variety of power sources for propulsion. For instance, gasoline, diesel, natural gas, or other alternative fuels may be combusted by an engine to generate engine torque. A hybrid electric vehicle (HEV) uses one or more electric machines and an engine as alternative or complementary sources of torque. In an HEV, engine torque may be delivered to a transmission input or output member alone or in conjunction with motor torque from one or both of the electric machines. The engine may be turned off in an electric vehicle operating mode to conserve fuel. An extended-range electric vehicle (EREV) uses engine torque to selectively power an electric generator without transmitting engine torque to the transmission. A battery electric vehicle (BEV) lacks an engine as part of its powertrain, and thus uses electrical energy to generate motor torque for vehicle propulsion. A fuel cell vehicle (FCV) utilizes electrical energy from a fuel cell stack process to power an electric machine and/or charge a battery pack.

Regardless of the powertrain configuration and the specific type of reserve fuel or energy source used aboard the vehicle, an onboard controller is able to regulate the torque contribution of the available torque sources. The controller receives input signals from various sensors that collectively monitor current operating conditions. The controller executes algorithms or control logic to determine a powertrain operating mode that is suitable for the current operating conditions in terms of performance or energy efficiency. The ability of a powertrain to function in an optimal manner is largely dependent upon the speed and overall accuracy of the controller's adaptation to the dynamically changing operating conditions.

SUMMARY

A vehicle is disclosed herein that includes a powertrain, sensors, and a controller having a programmed energy/power (E/P) prediction model. The E/P prediction model allows the controller to predict energy consumption of the vehicle over a predetermined travel route, without respect to the particular type of energy source(s) used aboard the vehicle. The E/P prediction model proceeds using forward-looking or "look-ahead" information. The controller is also configured to correct the E/P prediction model's overall predictive accuracy over time using an error feedback loop that is informed by real-time data and a learned vehicle performance. Ultimately, the controller uses the corrected prediction to optimize performance of the vehicle in a manner suited for the vehicle's powertrain configuration, such as by calculating and displaying route energy predictions with improved accuracy for BEVs or by selecting an appropriate powertrain operating mode for HEVs, EREVs, or FCVs.

In a non-limiting example embodiment, a vehicle includes a set of drive wheels, an energy source having an available energy, a torque-generating device powered by the energy source to provide an input torque, a transmission configured to receive the input torque and deliver an output torque to the set of drive wheels, and a controller. The controller in this particular embodiment is configured to predict a rate of consumption of the available energy from the energy source, which may include multiple different energy sources, along a predetermined travel route using onboard data, offboard data, and a first logic block. The controller corrects the predicted energy consumption over time using the onboard data, offboard data, and an error correction loop between a second logic block and the first logic block. Thereafter, the controller executes a control action with respect to the vehicle using the corrected energy consumption, including changing a logic state of the vehicle.

The vehicle may include a display screen. In such an embodiment, changing the logic state may include updating an estimated remaining range of the vehicle with respect to the predetermined travel route using the corrected energy consumption and then displaying the updated remaining electric range via the display screen.

In some configurations the energy source includes an energy storage system (ESS), and the torque-generating device includes an electric machine that is electrically connected to the ESS. In other configurations the energy source may include a supply of combustible fuel, with the torque-generating device including an engine that is powered by combustion of the combustible fuel. Or, the energy source may include hydrogen and a hydrogen fuel cell, with the torque-generating device including an electric machine energized via an output current from the hydrogen fuel cell. As the transient response of a fuel cell differs greatly from that of an engine, the methodology may take actions such as scheduling the fuel cell to begin generating electricity earlier in a given drive cycle, e.g., when a road load is imminent, but otherwise proceeds in a similar manner regardless of the identity of the energy source or sources.

Changing the logic state may include turning the engine on so as to transition the vehicle from a charge-depleting mode in which the ESS is discharged to a first threshold state of charge (SOC) to a charge-sustaining mode in which the SOC of the ESS is maintained above a second SOC that is higher than the first SOC.

The controller may divide the predicted energy consumption along the predetermined travel route into power groups having different relative power levels, and may also turn the engine on during the highest of the power groups to enter the charge-sustaining mode.

The offboard data according to certain embodiments may include elevation data describing an elevation of the predetermined travel route, route speed data describing an estimated speed of the vehicle along the predetermined travel route, environmental data describing an environment of the predetermined travel route, position data describing coordinates of the vehicle, and real-time traffic data describing traffic conditions along the predetermined travel route.

The onboard data may include a fluid temperature of the transmission, heating, ventilation, and air conditioning (HVAC) usage data of the vehicle, and an SOC of the ESS.

The controller may include a spin loss logic block configured to determine spin losses of the transmission using the fluid temperature, with the controller predicting the energy consumption of the vehicle using the spin losses.

The environmental data may include one or more of wind speed and direction, precipitation, and solar load along the predetermined travel route.

The controller may also include a delta speed logic block operable for calculating a delta speed value indicative of predicted acceleration of the vehicle along the predetermined travel route, and for predicting the energy consumption of the vehicle using the delta speed value.

A method is also disclosed herein for use with a vehicle having a powertrain, including an electric machine that is selectively energized by an energy storage system to generate motor torque, and a transmission configured to receive the motor torque from the electric machine and deliver output torque to a set of drive wheels. An example embodiment of the method includes receiving offboard and onboard data via a controller, and then predicting energy consumption of the powertrain using the offboard data, the onboard data, and a first logic block as the vehicle travels along a predetermined travel route. The method may also include correcting the predicted energy consumption using the offboard data, the onboard data, and an error correction loop between a second logic block and the first logic block. Thereafter, the method proceeds by executing a control action with respect to the vehicle via the controller using the corrected energy consumption, including changing a logic state of the vehicle by transmitting output signals to a display screen to thereby display an estimated electric range of the vehicle and/or controlling an operating mode of the powertrain.

The above-noted and other features and advantages of the present disclosure are readily apparent from the following detailed description of the best modes for carrying out the disclosure when taken in connection with the accompanying drawings.

Figure 1:
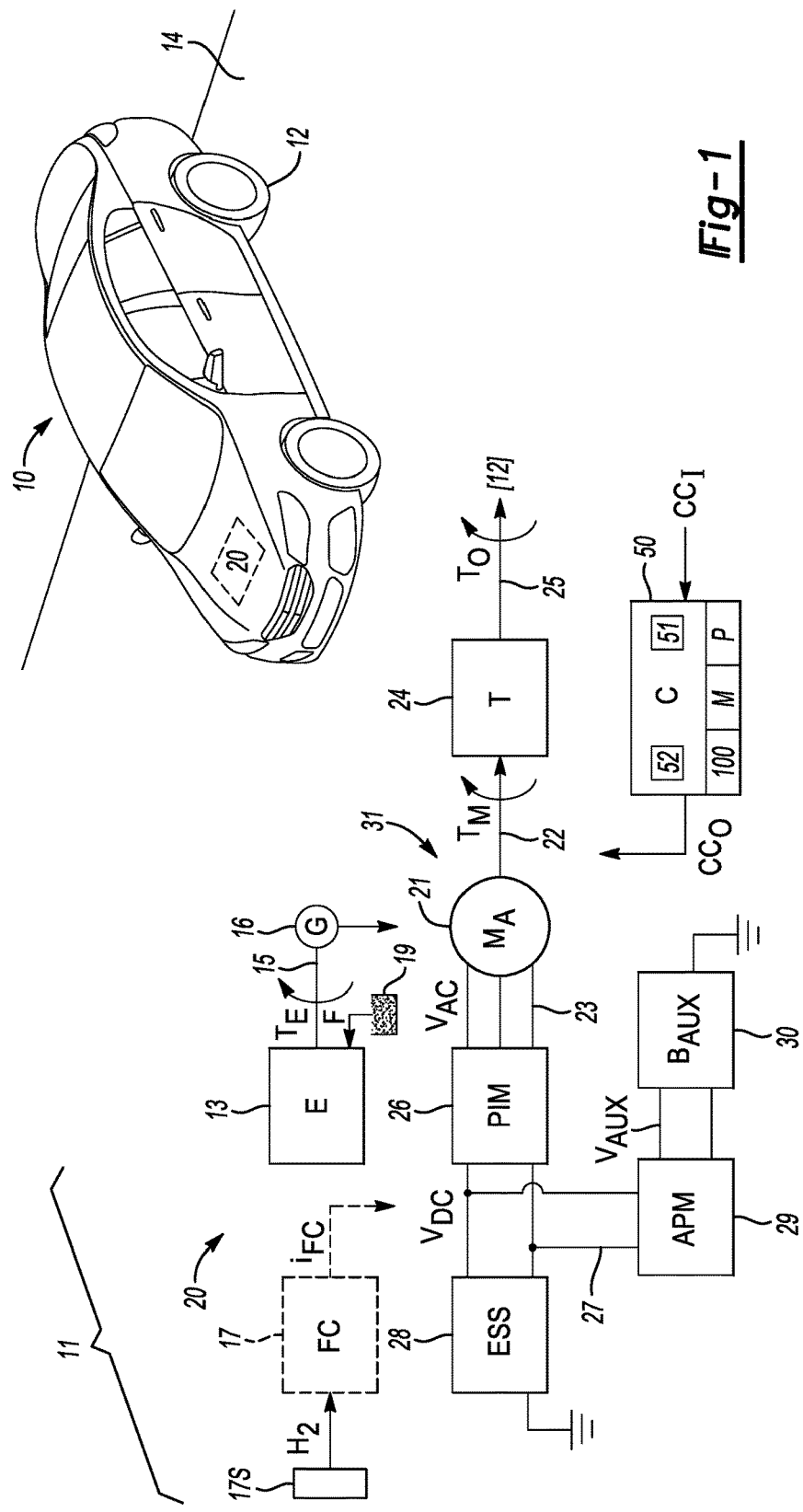
FIG. 1 is a schematic illustration of an example vehicle having a powertrain and a controller programmed to predict energy consumption of the vehicle along a predetermined travel route, correct the predictions over time using an error feedback loop, and optimize functionality of the vehicle using the corrected route energy prediction as set forth herein.

The present disclosure is susceptible to various modifications and alternative forms. Representative embodiments are shown by way of example in the drawings and are described in detail herein. However, novel aspects of the disclosure are not limited to the particular forms illustrated in the drawings. Rather, the disclosure is intended to cover modifications, combinations, and/or alternatives falling within the scope of the disclosure as defined by the appended claims.

DETAILED DESCRIPTION

Referring to the drawings, wherein like reference numbers refer to like components throughout the several views, an example motor vehicle 10 is depicted in FIG. 1. The vehicle 10 includes a set of drive wheels 12 in rolling frictional contact with a road surface 14. The vehicle 10 includes a powertrain 20 using one or more energy sources, the rate of power/energy consumption of which is automatically predicted and corrected via a controller (C) 50 as the vehicle 10 travels along a predetermined travel route, doing so according to a method 100 as described below with additional reference to FIGS. 2-7A. The controller 50 is configured to receive input signals (arrow $CC_I$) during operation of the vehicle 10 and generate output signals (arrow $CC_O$) that change a logic state of the vehicle 10 in some way, such as by regulating operation or changing an operating mode of the powertrain 20 and/or commanding a display or other function of the vehicle 10.

Energy sources 11 of the vehicle 10 vary with the configuration of the vehicle 10. For example, the vehicle 10 may include an internal combustion engine (E) 13 that generates engine torque (arrow $T_E$) by combusting fuel (arrow F) supplied from a fuel tank 19, such as gasoline, diesel fuel, biofuel, ethanol, or natural gas. An energy storage system (ESS) 28 such as a multi-cell battery pack, flywheel, ultracapacitor, or other suitable device for storing standby power may be used as an energy source 11. The energy source 11 provides an available energy to power the various torque-generating devices of the vehicle 10, and may include hydrogen (arrow H2) supplied under pressure from a hydrogen supply tank 17S and a hydrogen fuel cell stack (FC) 17 producing a fuel cell output current (arrow $i_{FC}$). Energy from such sources 11 may be used to power one or more torque-generating devices, e.g., the engine 13 and/or an electric machine ($M_A$) 21. These and other possible energy sources 11 may be used within the scope of the present disclosure.

One possible regulated function is the prediction of power/energy consumption of the vehicle 10 as the vehicle 10 negotiates a given travel route or trip, as well as the adaptive correction of such route energy predictions using real-time information. Ultimately, the controller 50 executes a control action aboard the vehicle 10 to change a logic state or physical state of the vehicle 10 or one of its subsystems, doing so using the corrected energy predictions. For instance, the controller 50 may transition the powertrain 20 between a charge-depleting mode and a charge-sustaining mode at a more efficient point in time, possibly including scheduling the fuel cell stack to turn on or off, and/or display more accurate electric range information to an operator of the vehicle 10. Commanding maximum charging of a multicell battery sometimes results in excessive heating and potential degradation of individual battery cells. Thus, more accurate predictions of a true remaining range of the vehicle 10 prior to commencing a trip is used to improve the overall operating life and performance efficiency of the vehicle 10.

The vehicle 10 in the example configuration of FIG. 1 may include the electric machine 21 that is selectively energized to generate motor torque (arrow $T_M$) for use in vehicle propulsion. In various example embodiments, the vehicle 10 may be configured as a hybrid electric vehicle, a plug-in hybrid electric vehicle, a fuel cell vehicle, an extended-range electric vehicle as shown, or a battery electric vehicle. Although shown as a sedan-style passenger vehicle, the vehicle 10 may be alternatively configured as a crossover vehicle, a sport utility vehicle, a recreational vehicle, a truck, a bus, a commercial vehicle, or a mobile platform in possible example embodiments. The following description of an extended-range electric vehicle is therefore used for illustrative purposes without limiting applications to such a configuration.

In the range-extending configuration of the powertrain 20 shown in FIG. 1, electrical phase leads 23 of the electric machine ($M_A$) 21 are electrically connected to and selectively energized or powered by a high-voltage energy storage system (ESS) 28, with the term "high voltage" being relative to auxiliary/low voltage levels. When energized by the ESS 28, the electric machine 21 generates the motor output torque (arrow $T_M$) via rotation of an output shaft 22. The motor output torque (arrow $T_M$) may be transmitted to a transmission (T) 24, a rotatable output member 25 of which ultimately delivers output torque (arrow $T_O$) to the drive wheels 12 for propulsion of the vehicle 10. Although omitted from FIG. 1 for simplicity, the vehicle 10 may be configured as a plug-in vehicle in which the ESS 28 includes a multi-cell battery pack that is plugged into an offboard energy supply (not shown), such as a charging outlet, and recharged when the vehicle 10 is not running.

In the example embodiment of FIG. 1, an internal combustion engine (E) 13 produces engine torque (arrow $T_E$) about a crankshaft 15 via a fuel-air combustion process to drive an electric generator (G) 16 and thereby produce electrical energy at levels sufficient for recharging the ESS 28, and/or for directly powering the electric machine 21. To provide the requisite electrical power for rotating the output shaft 22 of the electric machine 21, the ESS 28 in certain embodiments may include an ultracapacitor, or individual battery cells (not shown) utilizing an application-suitable battery chemistry, e.g., lithium ion, nickel metal hydride (NiMH), nickel cadmium (NiCd), or sodium nickel chloride (NaNiCl). A power inverter module (PIM) 26 is electrically connected to the ESS 28 via a direct current voltage bus ($V_{DC}$) 27. The PIM 26 inverts or rectifies electrical power from direct current (DC) to alternating current (AC) and vice versa as needed, such as via internal pulse width modulation (PWM)-based switching control. The DC voltage bus ($V_{DC}$) 27 may be connected to an auxiliary power module (APM) 29 in the form of a DC-DC converter capable of reducing the voltage level of the DC voltage bus 27 to auxiliary 12-15 VDC levels ($V_{AUX}$) suitable for storage in an auxiliary battery ($B_{AUX}$) 30 and/or for powering auxiliary electrical devices and systems aboard the vehicle 10.

In order to execute the method 100, the controller 50 is programmed with energy/power (E/P) prediction model 52. The E/P prediction model 52 is used to predict energy consumption of the vehicle 10 as the vehicle 10 travels from an origin to a destination of a route using forward-looking or "look-ahead" information, and to adaptively improve or correct the look-ahead prediction over time using an error correction loop that is informed by real-time data and observed actual performance of the vehicle 10. As noted briefly above, the controller 50 uses the corrected prediction to optimize performance of the vehicle 10, such as by calculating and displaying route energy predictions with improved levels of predictive accuracy to ensure a driver is able to reach a destination before exhausting available energy, or by selecting an appropriate powertrain operating mode, such as by controlling timing of a switchover to/from electric and gasoline power and/or initiating energy-generating operation of the fuel cell stack 17.

The controller 50, which is in communication with components of the powertrain 20 over a controller area network bus or other suitable communications channels, includes a processor (P) and memory (M). The memory (M) may include tangible, non-transitory memory, such as optical, magnetic, flash, or other read-only memory. The controller 50 also includes a display screen 51 such as a navigation or infotainment touch-screen and sufficient amounts of random access memory, electrically-erasable programmable read only memory, etc., a high-speed clock, analog-to-digital and digital-to-analog circuitry, and input/output circuitry and devices, and appropriate signal conditioning and buffer circuitry. Logic and control functionality of the controller 50 used in the execution of the method 100 will now be described in detail with reference to FIGS. 2-7A.

Figure 2:
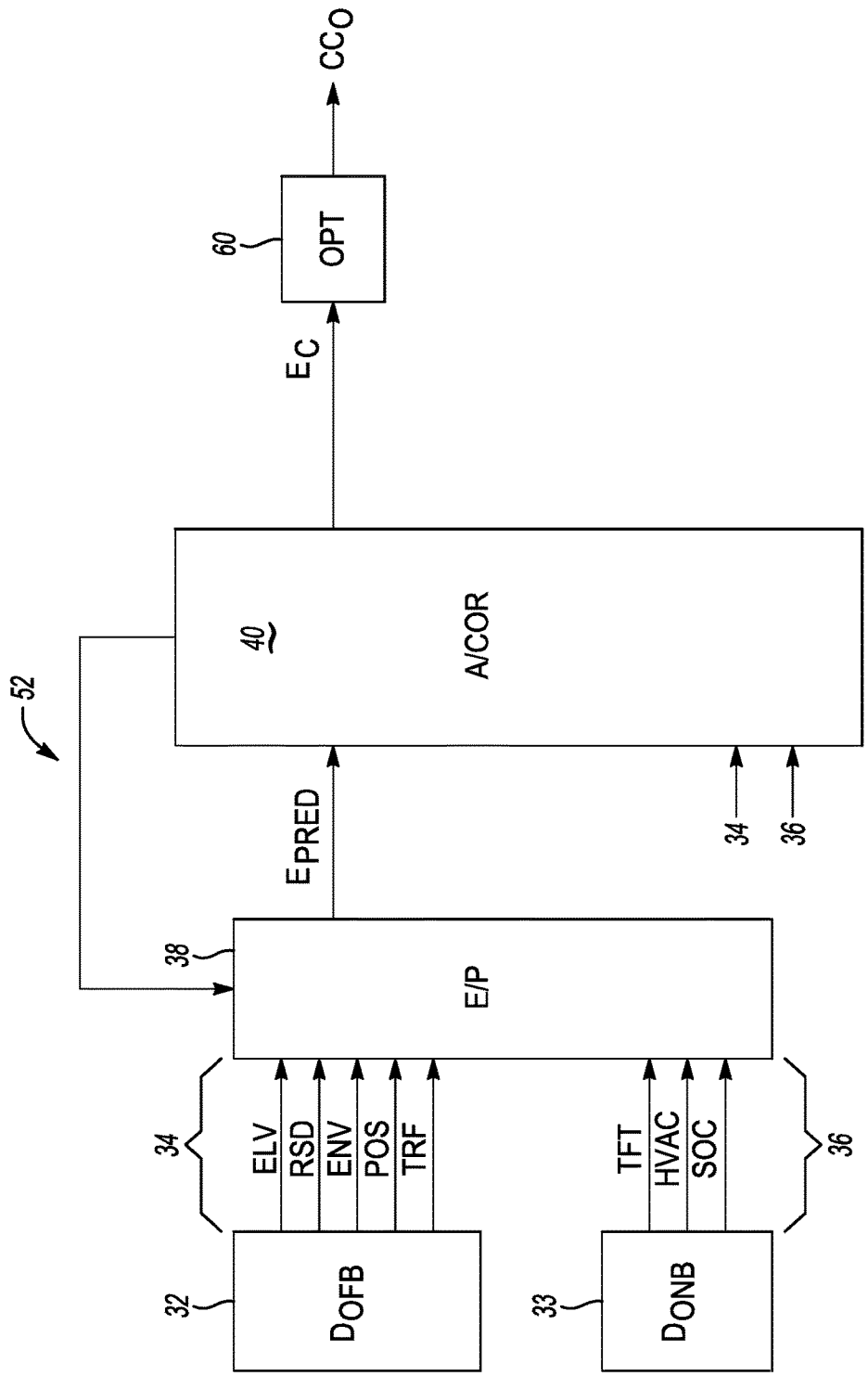
FIG. 2 is a schematic block diagram of the route energy prediction, correction, and system optimization function of the controller shown in FIG. 1.

FIG. 2 depicts a schematic block diagram for the E/P prediction model 52 of controller 50. The various control blocks encompassing the E/P prediction model 52 may be embodied as programmed software routines or modules implemented using the requisite hardware. As inputs to the E/P prediction model 52, the controller 50 of FIG. 1 receives offboard data 34 and onboard data 36 from respective offboard and onboard data blocks ($D_{OFB}$) 32 and ($D_{ONB}$) 33. As the names indicate, "offboard" data is collected, reported, or otherwise originated outside of the vehicle 10, while "onboard" data is collected, reported, or otherwise originated within the vehicle 10.

The offboard data 34 collected by or available through the offboard data block 32 of FIG. 2 may include elevation data (ELV), route speed data (RSD), environmental data (ENV), position data (POS), and real-time traffic data (TRF). The elevation data (ELV) may include received or reported altitude information for various waypoints along a travel route of the vehicle 10. Route speed data (RSD) may include historic, posted, or estimated speeds for various road segments along the travel route. With respect to environmental data (ENV), such data may include ambient air temperature, precipitation levels, relative humidity, and wind speed and direction. In some embodiments, the controller 50 may use an ultraviolet (UV) index as a proxy for solar energy as part of the environmental data (ENV), or radar data to track precipitation along the travel route. The position data (POS) may be in the form of GPS coordinates describing the present position of the vehicle 10 on a geospatial map. The real-time traffic data (TRF) may be reported through networked navigation systems to include traffic congestion due to accidents, construction, or other factors.

The onboard data 36 from the onboard data block 33 may include a reported transmission fluid temperature (TFT) of the transmission 24 shown in FIG. 1, as well as heating, ventilation, and air conditioning (HVAC) data and settings. Additionally, the onboard data 36 may include a reported or calculated state of charge (SOC) of battery cells located within the ESS 28. These and other examples of the offboard and onboard data 34 and 36 may be contemplated within the scope of the present disclosure.

The offboard and onboard data 34 and 36 is received by an energy/power (E/P) prediction logic block 38 of the controller 50 and used to generate a route energy prediction (arrow $E_{PRED}$). As used herein, the term "route energy prediction" refers to an estimated or predicted amount or rate of electrical energy consumption or depletion of charge of the ESS 28 as the vehicle 10 travels along a given route. That is, the controller 50 generates and displays a travel route that a driver of the vehicle 10 is expected to follow. Assuming that the driver follows the displayed route, the controller 50 estimates the rate of energy depletion at various points along the route. Remaining energy or electric range of the vehicle 10 may be displayed to the driver via the display screen 51 of FIG. 1 based on such energy predictions, along with other control actions such as the display of the location of available charging stations along or in proximity to the route.

Thereafter, an adaptive correction (A/COR) logic block 40 is used to correct the energy prediction (arrow $E_{PRED}$) from the E/P prediction logic block 38 using the real-time data 34 and 36, thereby generating a corrected energy prediction (arrow $E_C$), with the controller 50 using the corrected energy prediction (arrow $E_C$) in an error feedback loop 53 with the E/P prediction logic block 38 to improve predictive accuracy. Optionally, the controller 50 uses an optimization logic block (OPT) 60 to execute a control action with respect to the vehicle 10 or the powertrain 20 of FIG. 1, e.g., via the output signals (arrow $CC_O$).

Figure 3:
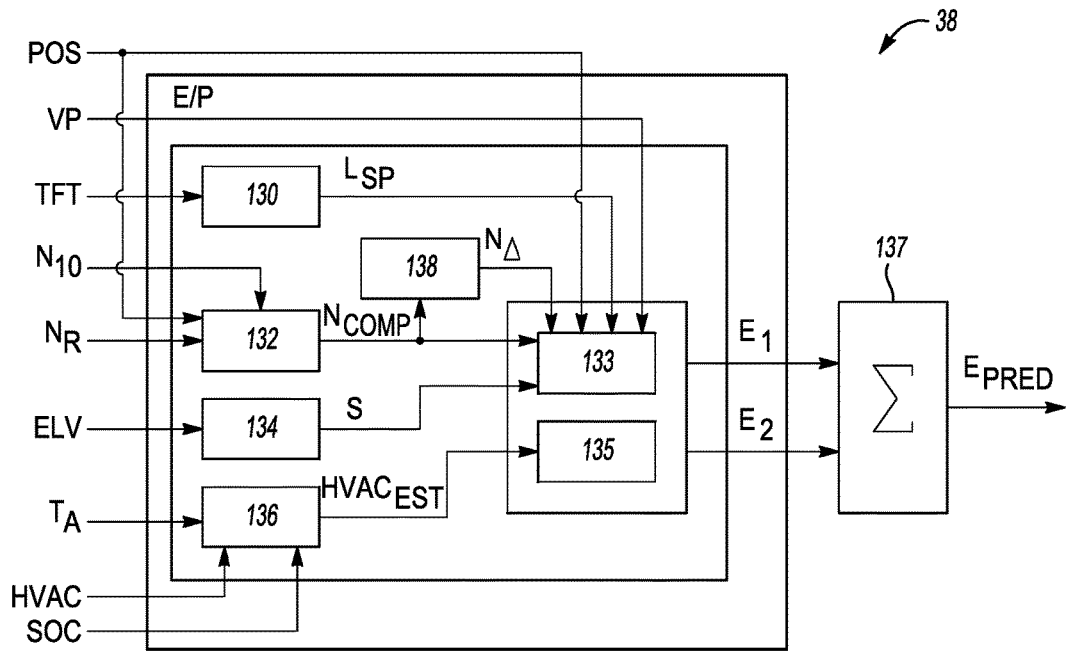
FIGS. 3 and 4 are a schematic energy/power prediction logic block and correction/learning logic block, respectively, of the controller of FIG. 1.

Functionality of the E/P prediction logic block 38 and the adaptive correction logic block 40 is described in greater detail with reference to FIGS. 3 and 4, respectively. Referring first to FIG. 3, in an example embodiment the E/P prediction logic block 38 receives the transmission fluid temperature (arrow TFT) and calculates transmission spin losses ($L_{SP}$) via a spin loss logic block 130. The transmission 24 shown schematically in FIG. 1 is a fluid-actuated and cooled power transmission, i.e., a supply of transmission fluid is circulated via a fluid pump (not shown) to and from the transmission 24. The controller 50 thus associates an operating cost with the transmission fluid temperature (TFT), such as via a lookup table in memory (M) of FIG. 1, with transmission spin losses ($L_{SP}$) and energy inefficiency being higher at lower temperatures. Logic block 132 receives a measured or reported vehicle speed ($N_{10}$) and the position data (POS) along with an estimated route speed ($N_R$) and calculates a compensated speed ($N_{COMP}$) over a given segment of the predicted travel route. The estimated route speed ($N_R$) may be determined as a function of a reported live speed, e.g., from traffic cameras, navigation systems, historical speeds, and posted speed limits. Informed by the actual vehicle speed ($N_{10}$), the logic block 132 may derive the compensated speed ($N_{COMP}$), which in turn more accurately estimates the route speed along different segments of the travel route.

Additionally, a logic block 134 may receive the elevation data (ELV) described above and estimate a slope (arrow S) of terrain over upcoming route segments as a function of the route elevation and distance. A logic block 136 may receive the ambient temperature ($T_A$) along the route, current HVAC settings and data (HVAC), and the battery state of charge (SOC), and output an estimated HVAC energy usage (HVA-$C_{EST}$). Logic block 138, referred to herein as the "delta speed" block, uses the compensated speed ($N_{COMP}$) from logic block 132 to determine an amount of energy associated with changes or "deltas" in vehicle speed, e.g., from acceleration due to upcoming on-ramps or other segments in which the vehicle 10 is expected to accelerate. The delta speed ($N_A$) is then output from logic block 138.

Propulsion energy/power consumption (arrow $E_1$) is then calculated using a logic block 133, with inputs to the logic block 133 being the transmission spin losses ($L_{SP}$), delta speed ($N_A$), position (POS), and calibrated vehicle parameters (arrow VP) such as mass, aerodynamics, tire pressure/rolling resistance, system conversion losses, etc. Separately, HVAC energy/power consumption (arrow $E_2$) is calculated at logic block 135 using the estimated HVAC use (HVA-$C_{EST}$) from logic block 136, with estimated propulsion energy/power consumption (arrow $E_1$) from logic block 133 and estimated HVAC energy/power consumption (arrow $E_2$) from logic block 135 added at a summation ($\Sigma$) logic block 137 to generate the predicted energy consumption (arrow $E_{PRED}$) shown in FIG. 2 and noted above. The predicted energy consumption (arrow $E_{PRED}$) thereafter becomes an input to the adaptive correction logic block 40 shown in FIGS. 2 and 4.

As illustrated in FIG. 3, current energy predictions conducted by the controller 50 are based on nominal conditions. The E/P prediction logic block 38 provides a forward-looking strategy that calculates the amount of energy it will take to climb and descend terrain over a given route, to thermally condition a passenger cabin of the vehicle 10 and the ESS 28, and to move the vehicle 10 at expected travel speeds which may vary with posted speed limits, traffic, and weather conditions over the course of the route. Use of the E/P prediction logic block 38 of FIG. 3 is thus intended to ensure that a predicted electrical range of the vehicle 10 is more accurate before a driver of the vehicle 10 begins traveling along a given travel route, as well as during the drive itself as the prediction is continuously or periodically updated in a feedback loop. Such adaptive updating is provided by operation of the adaptive correction logic block 40, which will now be described in greater detail with reference to FIG. 4.

The adaptive correction logic block 40 may include a correction logic block (COR) 41, a comparison logic block (COMP) 42, and an actual energy/power calculation logic block 43. The predicted energy consumption (arrow $E_{PRED}$) from logic block 38, as described above with reference to FIG. 3, is used as a first input to logic block 40. In particular, the predicted energy consumption (arrow $E_{PRED}$) is fed to logic blocks 41 and 42, with the respective offboard and onboard data 34 and 36 from modules 32 and 33 serving as inputs to logic block 43. Calculations occurring at logic block 43 may include a road load ($L_D$), a live speed ($N_L$) of the vehicle 10, driver technique (DT), and HVAC energy use (HVAC). The actual values are then fed forward from logic block 43 as inputs to the comparison logic block 42.

The road load ($L_D$) noted above encompasses a static load on the vehicle 10, i.e., based forces or torques that oppose motion of the vehicle 10, e.g., rolling friction and aerodynamic drag. The live speed ($N_L$) of the vehicle 10 is the actual speed, which is influenced by traffic, road conditions, and the like. In terms of driver technique (DT), this refers to the demonstrated driving behavior of a given operator of the vehicle 10. For instance, the memory (M) of the controller 50 of FIG. 1 may be programmed with driving characteristic profiles for multiple operators, e.g., drivers A and B. Driver A may have a history of aggressive driving, such as a demonstrated energy-depleting tendency to rapidly accelerate, corner, and brake, while driver B may have a history of gradual acceleration and braking conducive to promoting energy efficiency. The HVAC energy use (HVAC) is the actual usage of heating or air conditioning systems in the vehicle 10 through the trip, either of which presents a load on the ESS 28 that affects the operating efficiency of the powertrain 20 of FIG. 1. The actual values are fed forward as inputs to the comparison logic block 42.

Figure 4:
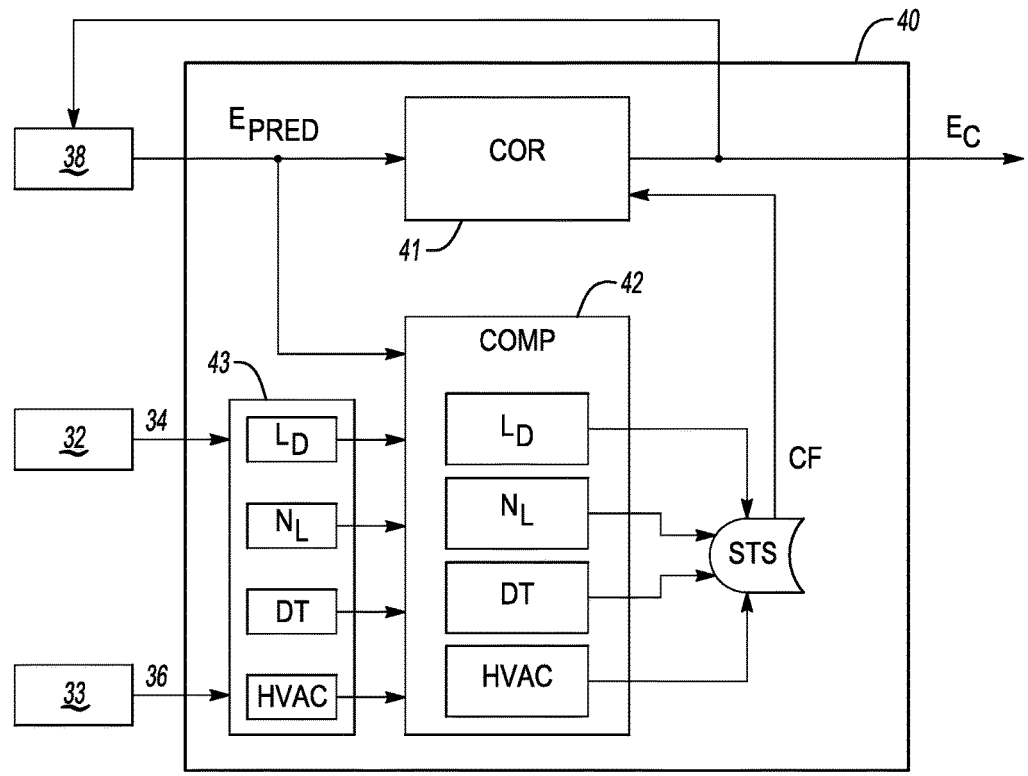

The comparison logic block 42 of FIG. 4 receives the predicted energy consumption (arrow $E_{PRED}$) from logic block 38 of FIG. 3 and the actual energy consumption from logic block 43, i.e., in terms of road load ($L_D$), live speed ($N_L$), driver technique (DT), and HVAC energy use (HVAC). As the name indicates, the comparison logic block (COMP) 42 determines, via a comparison function, a variation of predicted values from actual values for road load ($L_D$), live speed ($N_L$), driver technique (DT), and HVAC energy use (HVAC) over the travel route. The differences may be output to a short-term storage (STS) queue. The controller 50 quantifies the variation as a numeric correction factor (CF), e.g., a gain or multiplier, and feeds the numeric correction factor (CF) back to the energy/power correction logic block (COR) 41. There, the controller 50 determines the adjusted/corrected energy prediction (arrow $E_C$) as a function of the initial prediction ($Ep_{RED}$) and the correction factor (arrow CF), e.g., $E_C = (E_{PRED})(CF)$.

Figure 5:
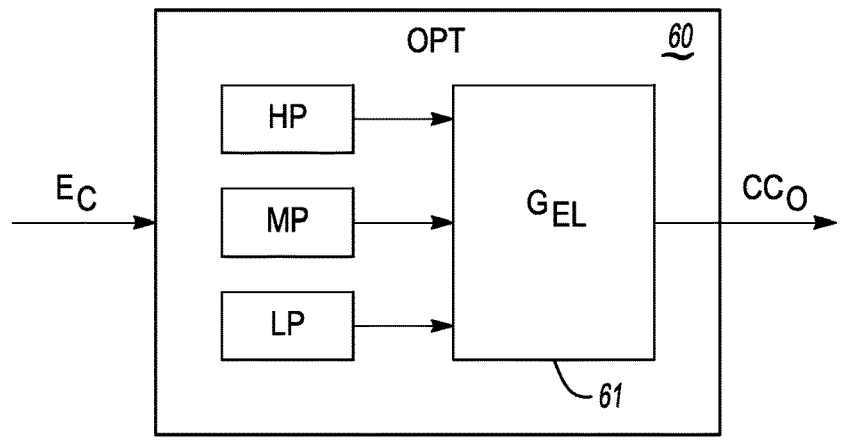
FIG. 5 is a schematic optimization logic block of the controller shown in FIG. 1.

FIG. 5 schematically depicts operation of the optimization logic block 60 of FIG. 2. The adjusted/corrected energy prediction (arrow $E_C$) from logic block 41 described above with reference to FIG. 4 is received by the optimization logic block 60. Energy/power consumption of the vehicle 10 over a given travel route may be broken into a plurality of relative power groups, such as a high power (HP) group, a medium power (MP) group, and a low power (LP) group. The controller 50 may use an energy load grouping ($G_{EL}$) logic block 61 to group similar energy loads together and execute a control action corresponding to the energy group.

An example control action includes transmitting the output signals (arrow $CC_O$) from the controller 50 to the powertrain 20 of FIG. 1 to command a change in the current operating mode of the vehicle 10, such as by turning the engine 13 on to commence onboard charging of the ESS 28 rather than continuing to operate in a charge-depleting mode. In a battery electric embodiment in which the engine 13 is not part of the powertrain 20, energy prediction by the controller 50 at the onset of a trip may result in the controller 50 recommending a stop at a particular charging station based on an estimated SOC upon reaching the charging station. A possible control action for such a powertrain 20 may include providing a warning to the driver to stop earlier than originally planned, or diverting from the intended route to a different charging station so as to ensure a sufficient SOC upon arrival. A possible approach toward such energy grouping will now be described with reference to FIGS. 6, 7, and 7A.

Figure 6:
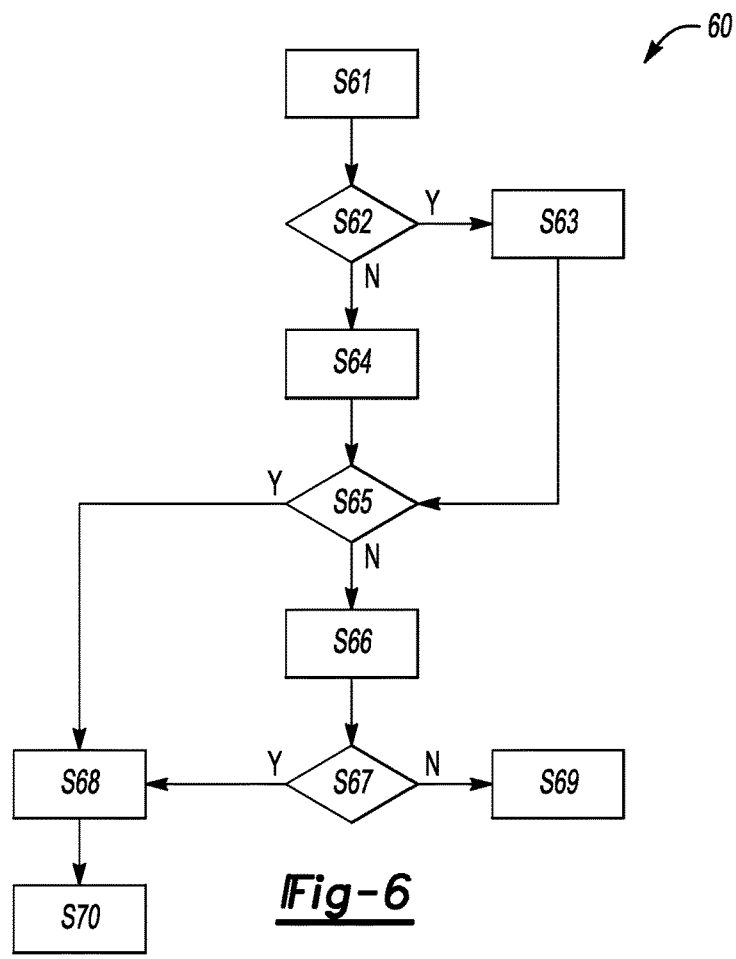
FIG. 6 is a schematic logic flow diagram describing an example embodiment for optimizing system functionality of the vehicle of FIG. 1 using corrected route energy predictions.

FIG. 6 depicts a flow chart describing individual process blocks or steps for implementing the optimization logic block 60 of FIG. 5. Step S61 entails determining the energy loads corresponding to each of the low, medium, and high power groups (HP, MP, LP) of FIG. 5 and measuring the ambient temperature ($T_A$) of FIG. 3. The controller 50 then proceeds to step S62 once these values are determined.

Step S62 may include comparing the ambient temperature ($T_A$) and the adjusted/corrected energy prediction ($E_C$) to calibrated limits, which in turn may be prerecorded in the memory (M) of controller 50. The controller 50 implements step S63 when the ambient temperature ($T_A$) and the adjusted/corrected energy prediction ($E_C$) are both within their respective calibrated limits. Otherwise, step S64 is implemented.

Step S63 may include reordering the load groups of FIG. 4 such that groups occurring earlier in a given trip are prioritized as the optimization logic block 60 prepares to execute step S65. The controller 50 then proceeds to step S65.

At step S64, the controller 50 reorders the load groups of FIG. 4 such that highest power groups are prioritized prior to executing step S65. The controller 50 then proceeds to step S65.

Step S65 entails checking the prioritized power groups from steps S63 and S64 to see if a single group is able to supply the necessary energy for reaching a destination of the trip. If so, the controller 50 proceeds to step S68. The controller 50 implements step S66 in the alternative when a single group is unable to supply the necessary energy for reaching the trip destination.

Step S66 may include combining larger power groups. For the purposes of step S66, the controller 50 may ignore a given group if that group is sustained for less than a threshold duration. The controller 50 then proceeds to step S67.

At step S67, the controller 50 checks the power groups that were prioritized at steps S63 and S64 and determines whether operating in a given one of the power zones will provide the required energy for reaching the destination. If so, the controller 50 proceeds to step S68. Otherwise the controller 50 proceeds to step S69.

Step S68 includes determining an appropriate drive mode for the prioritized groups via the controller 50, and deciding on an activation point within the drive mode as a time at which the controller 50 commands the engine 13 to turn on. The controller 50 activates the engine-on drive mode in this instance and proceeds to step S70.

Step S69 includes exiting the optimization logic block 60 and commanding or continuing with a default charge-sustaining mode.

Step S70 entails transmitting the output signals (arrow $CC_O$) of FIG. 1 to the powertrain 20 of FIG. 1 to thereby command a transition from an engine-off charge-depleting mode to an engine-on charge-sustaining mode at the activation point determined at step S68.

Figure 7:
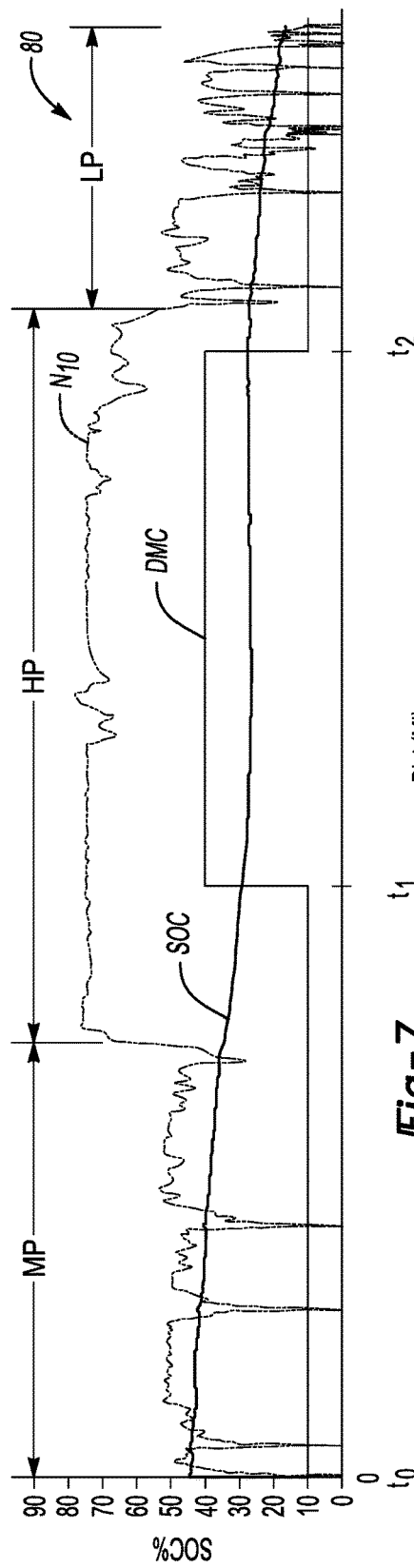
FIGS. 7 and 7A are schematic time plots of battery state of charge respectively with and without application of the functional optimization logic block of FIG. 6.
Figure 7A:
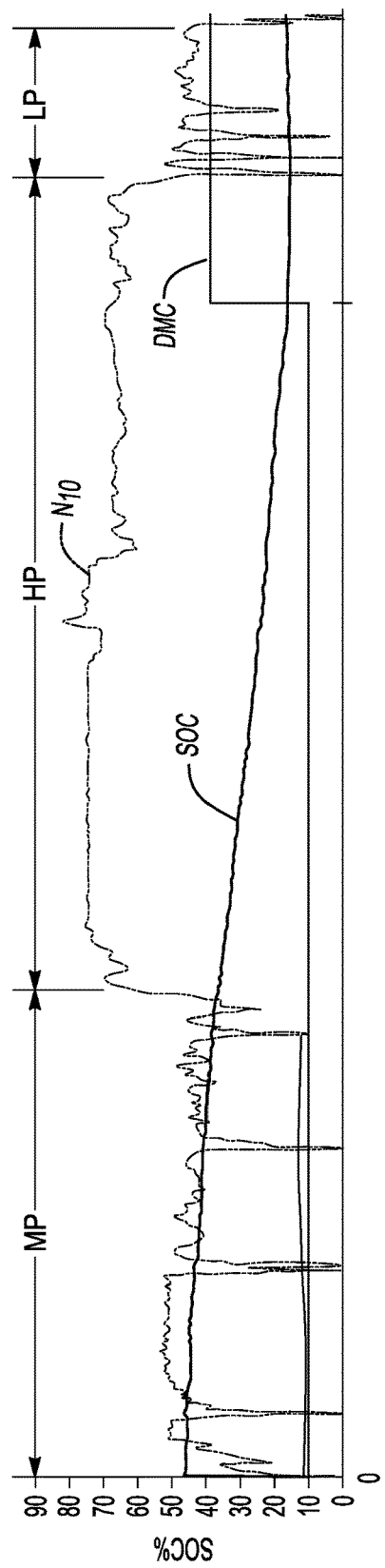

FIG. 7 depicts operation of the optimization logic block 60 as explained with reference to FIG. 6, while FIG. 7A provides a comparative powertrain control result absent application of logic block 60. Depicted in FIGS. 7 and 7A are traces 80 and 180, specifically the vehicle speed ($N_{10}$), state of charge (SOC) of the ESS 28 of FIG. 1, and a drive mode command (DMC). The drive mode command (DMC) corresponds to a binary signal, with a high value requesting the engine 13 of FIG. 1 to turn on and a low signal requesting the engine 13 to turn or remain off. SOC of the ESS 28 of FIG. 1 is depicted on the vertical axis as a percentage (%) of maximum charge, while a drive distance in miles is depicted on the horizontal axis. Possible drive modes include the charge-sustaining mode in which the engine 13 of FIG. 1 is turned on and used to power the generator 16, and thus to sustain the SOC of the ESS 28 at or above a calibrated SOC threshold, and a charge-depleting mode in which the engine 13 is turned off and the SOC is permitted to decrease to a low threshold level.

The example embodiment of FIG. 7 illustrates optimization of propulsion energy usage across a drive cycle having medium-power (MP), high-power (HP) and low-power (LP) groups, with an optimized electrical range to reduce emissions and increase electrical range. Traces 80 of FIG. 7 depict the effects on mode selection of logic blocks 38 and 40 of FIGS. 3 and 4, respectively. Traces 80 of FIG. 7 and 180 of FIG. 7A show that the vehicle 10 starts out in the medium-power (MP) group in a charge-depleting mode, i.e., the engine 13 is off and SOC is allowed to gradually decrease or bleed down toward zero without operation of the engine 13. Because SOC is largely exhausted at $t_3$ of FIG. 7A during high power (HP) operation before the vehicle 10 reaches the end of its travel route, the controller 50 switches to a charge-sustaining mode at $t_3$ by cycling the engine 13 on and off as needed. However, this occurs at a point that may not be as efficient as continued operation in a charge-depleting mode.

The same lower SOC limit is reached in FIG. 7 as demonstrated by traces 80. However, by operation of the present method 100 the controller 50 makes an earlier powertrain control decision at $t_1$ during high-power (HP) operation to turn on the engine 13. Thus, SOC of the ESS 28 of FIG. 1 is maintained in charge-sustaining mode during high-power operation until the controller 50 is certain that the vehicle 10 will reach its destination in charge-depleting mode, at which point the controller 50 commands the engine 13 to turn off at $t_2$. Shortly afterward, the powertrain 20 transitions to low-power (LP) operation.

Thus, the addition of the optimization logic block 60 of FIG. 2 allows the controller 50 to calculate and shift a charge-sustaining operation of the vehicle 10 having a variety of possible energy sources 11 to a more efficient drive state using both offboard and onboard data 34 and 36 of FIG. 2. Forward-looking energy usage prediction is provided before the drive cycle begins, this by operation of logic block 38 of FIG. 3. The feedback loop established between logic blocks 38 and 40 works over time to improve the forward-looking predictive accuracy of logic block 38. In embodiments in which the vehicle 10 lacks the engine 13, the method 100 may still be used to optimize range prediction, with the output signals (arrow $CC_O$) potentially used to display an updated range on a user interface of the controller 50.

Additionally, the forward-looking/predictive and adaptive nature of the present approach may be readily extended to autonomous vehicle fleets. Vehicles in such a fleet may have a destination loaded prior to starting a trip. Re-routes or unplanned weigh points added once such an autonomous vehicle is in route may be accurately evaluated as to the ability of the vehicle to reach its destination. Forward-looking prediction of terrain, environmental impact, and traffic information may enable a passenger to have a more reliable experience. Similarly, a fleet owner may be better able to understand the "return home" trip for the autonomous vehicle and/or customer once the ride to the original destination is completed.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; modifications, changes, and/or variations apparent from the foregoing descriptions are within the scope of the disclosure as defined in the appended claims. Moreover, the present concepts may expressly include combinations and sub-combinations of the preceding elements and features.

What is claimed is:

1. A vehicle comprising:
a set of drive wheels;
an energy source configured to store available energy;
a torque-generating device powered by the energy source and configured to generate an input torque;
a transmission configured to receive the input torque and deliver an output torque to one or more of the drive wheels to thereby propel the vehicle; and
a controller that is configured, as the vehicle travels along a predetermined travel route, to:
predict, via a first logic block of the controller, an energy consumption of the available energy using onboard data and offboard data, the first logic block predicting the energy consumption including calculating a summation of a propulsion system energy consumption and an auxiliary device energy consumption for the travel route based on the onboard and offboard data;
calculate, via a second logic block of the controller, a correction factor using real-time vehicle data, including actual vehicle speed data and actual auxiliary device load data, and driver technique data, including data indicative of a demonstrated driving behavior of an operator of the vehicle;
determine a corrected energy consumption as a function of the predicted energy consumption and the correction factor using an error correction loop between the second logic block and the first logic block; and
execute a control action with respect to the vehicle using the corrected energy consumption, the control action including changing a logic state of the vehicle.

2. The vehicle of claim 1, wherein the energy source includes an energy storage system (ESS) and the torque-generating device includes an electric machine that is electrically connected to the ESS.

3. The vehicle of claim 1, wherein the energy source includes a supply of combustible fuel and the torque-generating device includes an engine that is powered by combustion of the combustible fuel.

4. The vehicle of claim 1, wherein the energy source includes hydrogen and a hydrogen fuel cell stack, and wherein the torque-generating device includes an electric machine energized via an output current from the hydrogen fuel cell stack.

5. The vehicle of claim 1, further comprising a display screen, wherein changing the logic state includes updating a remaining range of the vehicle with respect to the predetermined travel route using the corrected energy consumption and then displaying the updated remaining range via the display screen.

6. The vehicle of claim 1, wherein the torque-generating device includes an engine and a motor, and the energy source includes an energy storage system (ESS), and wherein changing the logic state includes turning the engine on so as to transition the vehicle from a charge-depleting mode in which the ESS is discharged to a first threshold state of charge (SOC), to a charge-sustaining mode in which the SOC of the ESS is maintained above a second SOC that is higher than the first SOC.

7. The vehicle of claim 6, wherein the controller is further configured to divide the predicted energy consumption along the predetermined travel route into a plurality of power groups having different relative power levels, and to turn the engine on during a highest of the power groups to thereby enter the charge-sustaining mode.

8. The vehicle of claim 1, wherein the offboard data includes elevation data describing an elevation of the predetermined travel route, route speed data describing an estimated speed of the vehicle along the predetermined travel route, environmental data describing an environment of the predetermined travel route, position data describing coordinates of the vehicle, and real-time traffic data describing traffic conditions along the predetermined travel route.

9. The vehicle of claim 8, wherein the energy source includes an energy storage system (ESS), and wherein the onboard data includes a fluid temperature of the transmission, a heating, ventilation, and air conditioning (HVAC) usage data of the vehicle, and a state of charge of the ESS.

10. The vehicle of claim 9, wherein the controller includes a spin loss logic block configured to determine spin losses of the transmission using the fluid temperature, and is configured to predict the energy consumption of the vehicle using the spin losses.

11. The vehicle of claim 8, wherein the environmental data includes one or more of: wind speed and direction, precipitation, and solar load.

12. The vehicle of claim 1, wherein the controller includes a delta speed logic block operable for calculating a delta speed value indicative of predicted acceleration of the vehicle along the predetermined travel route, and for predicting the energy consumption of the vehicle using the delta speed value.

13. A method for executing control actions of a vehicle having multiple drive wheels and a powertrain, the powertrain including an electric machine that is selectively energized by an energy storage system LESS) to generate motor torque, and a transmission configured to receive the motor torque from the electric machine and deliver output torque to one or more of the drive wheels to propel the vehicle, the method comprising:

receiving offboard and onboard data via a controller;

predicting, via a first logic block of the controller, an energy consumption of the vehicle using the offboard data and the onboard data as the vehicle travels along a predetermined travel route, wherein predicting the energy consumption includes calculating a summation of a propulsion system energy consumption and an auxiliary device energy consumption for the travel route based on the onboard and offboard data;

calculating, via a second logic block of the controller, a correction factor using real-time vehicle data, including actual vehicle speed data and actual auxiliary device load data, and driver technique data, including data indicative of a demonstrated driving behavior of an operator of the vehicle;

determine a corrected energy consumption as a function of the predicted energy consumption and the correction factor using an error correction loop between the second logic block and the first logic block; and executing a control action with respect to the vehicle via the controller using the corrected energy consumption, the control action including changing a logic state of the vehicle by transmitting output signals to a display screen to thereby display an estimated electric range of the vehicle and/or controlling an operating mode of the powertrain.

14. The method of claim 13, wherein executing the control action includes:

updating an estimated electric range of the vehicle with respect to the predetermined travel route using the corrected energy consumption; and displaying the updated estimated electric range via the display screen.

15. The method of claim 13, wherein the vehicle further includes an internal combustion engine that selectively powers the electric machine to generate the motor torque, and wherein changing the logic state includes turning the engine on so as to transition the vehicle from a charge-depleting mode, in which the ESS is discharged to a first threshold state of charge (SOC), to a charge-sustaining mode, in which the SOC of the ESS is maintained above a second SOC that is higher than the first SOC.

16. The method of claim 15, further comprising dividing the predicted energy consumption along the predetermined travel route into a plurality of power groups having different relative power levels, and turning the engine on during a highest of the power groups to thereby enter the charge-sustaining mode.

17. The method of claim 13, wherein receiving the offboard data includes receiving elevation data describing an elevation of the predetermined travel route, route speed data describing an estimated speed of the vehicle along the predetermined travel route, environmental data describing an environment of the predetermined travel route, position data describing coordinates of the vehicle, and real-time traffic data describing traffic conditions along the predetermined travel route, the environmental data including one or more of: wind speed and direction, precipitation, and solar load.

18. The method of claim 17, wherein receiving the onboard data includes receiving a fluid temperature of the transmission, a heating, ventilation, and air conditioning (HVAC) usage data of the vehicle, and a state of charge of the ESS.

19. The method of claim 18, further comprising calculating spin losses of the transmission via a spin loss logic block using the fluid temperature, and predicting the energy consumption of the vehicle using the spin losses.

20. The method of claim 17, further comprising calculating a delta speed value via a delta speed logic block of the controller, the delta speed value being indicative of predicted acceleration of the vehicle along the predetermined travel route, and predicting the energy consumption of the vehicle using the delta speed value.

* * * * *